United States Patent
Brennecke

(10) Patent No.: US 6,561,571 B1
(45) Date of Patent: May 13, 2003

(54) STRUCTURALLY ENHANCED ATTACHMENT OF A REINFORCING MEMBER

(75) Inventor: Eric Brennecke, Troy, MI (US)

(73) Assignee: L&L Products, Inc., Romeo, MI (US)

( * ) Notice: Subject to any disclaimer, the term of this patent is extended or adjusted under 35 U.S.C. 154(b) by 148 days.

(21) Appl. No.: 09/676,725

(22) Filed: Sep. 29, 2000

(51) Int. Cl.$^7$ .......................... B60R 27/00; B62D 29/00
(52) U.S. Cl. ...................... 296/187; 296/188; 296/205; 296/193; 296/901; 428/35.7; 428/119; 428/120; 428/122; 428/137; 293/109; 293/120; 293/136; 52/309.9; 52/721.4; 52/729.1; 52/731.6; 52/735.1; 52/736.3; 264/46.5; 264/46.6; 264/54; 264/277
(58) Field of Search .............................. 428/35.7, 119, 428/120, 122, 137; 52/309.9, 721.4, 729.1, 731.6, 735.1, 736.3, 795.1, 793.1; 264/46.6, 54, 277, 46.5; 293/109, 120, 136; 296/187, 198, 205, 193, 901

(56) References Cited

U.S. PATENT DOCUMENTS

| | | |
|---|---|---|
| 3,054,636 A | 9/1962 | Wessells, III |
| 3,123,170 A | 3/1964 | Bryant |
| 3,493,257 A | 2/1970 | Fitzgerald et al. |
| 3,649,375 A | 3/1972 | Venkatesan |
| 3,665,968 A | 5/1972 | DePutter |
| 3,746,387 A | 7/1973 | Schwenk |
| 3,757,559 A | 9/1973 | Welsh |
| 3,890,108 A | 6/1975 | Welsh |
| 4,019,301 A | 4/1977 | Fox |
| 4,082,825 A | 4/1978 | Puterbaugh |
| 4,090,734 A | 5/1978 | Inami et al. |
| 4,238,540 A | 12/1980 | Yates et al. |
| 4,378,395 A | 3/1983 | Asoshina et al. |
| 4,397,490 A | 8/1983 | Evans et al. |

(List continued on next page.)

FOREIGN PATENT DOCUMENTS

| | | |
|---|---|---|
| DE | 36 27 725 A1 | 2/1988 |
| DE | 40 28 895 C1 | 2/1992 |
| DE | 196 35 734 A1 | 4/1997 |
| DE | 196 44 047 A1 | 5/1998 |
| DE | 196 48 164 A1 | 5/1998 |
| DE | 198 12 288 C1 | 5/1999 |
| DE | 198 56 255 C1 | 1/2000 |
| DE | 198 58 903 A1 | 6/2000 |
| EP | 0 236 291 A2 | 9/1987 |
| EP | 0 679 501 A1 | 11/1995 |

(List continued on next page.)

OTHER PUBLICATIONS

Copending Application Serial No. 09/655,965 filed Sep. 6, 2000.
Copending Application Serial No. 09/858,939 filed May 16, 2001.
Copending Application Serial No. 09/859,126 filed May 16, 2001.
Copending Application Serial No. 09/906,289 filed Jul. 16, 2001.
Copending Application Serial No. 09/923,138 filed Aug. 6, 2001.

(List continued on next page.)

*Primary Examiner*—Harold Pyon
*Assistant Examiner*—Brian Egan
(74) *Attorney, Agent, or Firm*—Dobrusin & Thennisch PC

(57) ABSTRACT

A structurally enhanced attachment for use in reinforcing automotive rocker assemblies. An expandable material, such as a polymer-based foam, is disposed on a surface of an aluminum extrusion prior to integration of the extrusion into the vehicle and final assembly of the vehicle by the vehicle manufacturer. The system is activated as the vehicle undergoes the final vehicle assembly process, which activates and transforms the expandable material, preferably during an automobile paint operation, to expand, bond and fill the rocker assembly structure thereby structural adhering the extrusion with the rocker assembly and facilitating enhanced structural reinforcement.

22 Claims, 1 Drawing Sheet

U.S. PATENT DOCUMENTS

| | | |
|---|---|---|
| 4,440,434 A | 4/1984 | Celli |
| 4,457,555 A | 7/1984 | Draper |
| 4,463,870 A | 8/1984 | Coburn, Jr. et al. |
| 4,559,274 A | 12/1985 | Kloppe et al. |
| 4,610,836 A | 9/1986 | Wycech |
| 4,613,177 A | 9/1986 | Loren et al. |
| 4,695,343 A | 9/1987 | Wycech |
| 4,705,716 A | 11/1987 | Tang |
| 4,732,806 A | 3/1988 | Wycech |
| 4,751,249 A | 6/1988 | Wycech |
| 4,762,352 A | 8/1988 | Enomoto |
| 4,769,391 A | 9/1988 | Wycech |
| 4,803,108 A | 2/1989 | Leuchten et al. |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,898,630 A | 2/1990 | Kitoh et al. |
| 4,901,500 A | 2/1990 | Wycech |
| 4,908,930 A | 3/1990 | Wycech |
| 4,917,435 A | 4/1990 | Bonnett et al. |
| 4,922,596 A | 5/1990 | Wycech |
| 4,923,902 A | 5/1990 | Wycech |
| 4,978,562 A | 12/1990 | Wycech |
| 4,984,406 A | 1/1991 | Friesen |
| 4,989,913 A | 2/1991 | Moore, III |
| 4,995,545 A | 2/1991 | Wycech |
| 5,102,188 A | 4/1992 | Yamane |
| 5,122,398 A | 6/1992 | Seiler et al. |
| 5,124,186 A | 6/1992 | Wycech |
| 5,160,465 A * | 11/1992 | Soderberg .................. 264/46.5 |
| 5,213,391 A | 5/1993 | Takagi |
| 5,255,487 A | 10/1993 | Wieting et al. |
| 5,266,133 A | 11/1993 | Hanley et al. |
| 5,344,208 A | 9/1994 | Bien et al. |
| 5,358,397 A | 10/1994 | Ligon et al. |
| 5,373,027 A | 12/1994 | Hanley et al. |
| 5,395,135 A | 3/1995 | Lim et al. |
| 5,506,025 A | 4/1996 | Otto et al. |
| 5,560,672 A | 10/1996 | Lim et al. |
| 5,575,526 A | 11/1996 | Wycech |
| 5,580,120 A | 12/1996 | Nees et al. |
| 5,642,914 A | 7/1997 | Takabatake |
| 5,648,401 A | 7/1997 | Czaplicki et al. |
| 5,649,400 A | 7/1997 | Miwa |
| 5,652,039 A | 7/1997 | Tremain et al. |
| 5,660,116 A | 8/1997 | Dannawi et al. |
| 5,707,098 A | 1/1998 | Uchida et al. |
| 5,725,272 A | 3/1998 | Jones |
| 5,731,069 A | 3/1998 | Delle Donne et al. |
| 5,755,486 A | 5/1998 | Wycech |
| 5,766,719 A | 6/1998 | Rimkus |
| 5,785,376 A | 7/1998 | Nees et al. |
| 5,786,394 A | 7/1998 | Slaven |
| 5,803,533 A | 9/1998 | Schulz et al. |
| 5,804,608 A | 9/1998 | Nakazato et al. |
| 5,806,915 A * | 9/1998 | Takabatake .................. 296/187 |
| 5,806,919 A | 9/1998 | Davies |
| 5,855,094 A | 1/1999 | Baudisch et al. |
| 5,866,052 A | 2/1999 | Muramatsu |
| 5,884,960 A | 3/1999 | Wycech |
| 5,885,688 A | 3/1999 | McLaughlin |
| 5,888,600 A | 3/1999 | Wycech |
| 5,888,642 A | 3/1999 | Meteer et al. |
| 5,894,071 A | 4/1999 | Merz et al. |
| 5,901,528 A | 5/1999 | Richardson |
| 5,904,024 A | 5/1999 | Miwa |
| 5,931,474 A | 8/1999 | Chang et al. |
| 5,932,680 A | 8/1999 | Heider |
| 5,934,737 A | 8/1999 | Abouzahr |
| 5,941,597 A | 8/1999 | Horiuchi et al. |
| 5,984,389 A | 11/1999 | Nuber et al. |
| 5,985,435 A | 11/1999 | Czaplicki et al. |
| 5,988,734 A | 11/1999 | Longo et al. |
| 5,992,923 A | 11/1999 | Wycech |
| 5,994,422 A | 11/1999 | Born et al. |
| 5,997,077 A | 12/1999 | Siebels et al. |
| 6,003,274 A | 12/1999 | Wycech |
| 6,004,425 A | 12/1999 | Born et al. |
| 6,006,484 A | 12/1999 | Geissbuhler |
| 6,022,066 A | 2/2000 | Tremblay et al. |
| 6,033,300 A | 3/2000 | Schneider |
| 6,050,630 A | 4/2000 | Hochet |
| 6,058,673 A * | 5/2000 | Wycech ..................... 52/721.4 |
| 6,059,342 A | 5/2000 | Kawai et al. |
| 6,068,424 A | 5/2000 | Wycech |
| 6,073,991 A | 6/2000 | Naert |
| 6,077,884 A | 6/2000 | Hess et al. |
| 6,079,180 A | 6/2000 | Wycech |
| 6,082,811 A | 7/2000 | Yoshida |
| 6,090,232 A | 7/2000 | Seeliger et al. |
| 6,092,864 A | 7/2000 | Wycech et al. |
| 6,094,798 A | 8/2000 | Seeliger et al. |
| 6,096,403 A | 8/2000 | Wycech |
| 6,096,791 A | 8/2000 | Born et al. |
| 6,099,948 A | 8/2000 | Paver, Jr. |
| 6,102,379 A | 8/2000 | Ponslet et al. |
| 6,102,473 A | 8/2000 | Steininger et al. |
| 6,103,341 A | 8/2000 | Barz et al. |
| 6,103,784 A | 8/2000 | Hilborn et al. |
| 6,110,982 A | 8/2000 | Russick et al. |
| 6,129,410 A | 10/2000 | Kosaraju et al. |
| 6,131,897 A | 10/2000 | Barz et al. |
| 6,135,542 A | 10/2000 | Emmelmann et al. |
| 6,139,094 A * | 10/2000 | Tepley et al. ............. 296/203.3 |
| 6,146,565 A | 11/2000 | Keller |
| 6,149,227 A | 11/2000 | Wycech |
| 6,150,428 A | 11/2000 | Hanley, IV et al. |
| 6,152,260 A | 11/2000 | Eipper et al. |
| 6,153,709 A | 11/2000 | Xiao et al. |
| 6,165,588 A * | 12/2000 | Wycech ..................... 428/122 |
| 6,168,226 B1 | 1/2001 | Wycech |
| 6,189,953 B1 | 2/2001 | Wycech |
| 6,196,621 B1 | 3/2001 | VanAssche et al. |
| 6,199,940 B1 | 3/2001 | Hopton et al. |
| 6,232,433 B1 | 5/2001 | Narayan |
| 6,233,826 B1 | 5/2001 | Wycech |
| 6,237,304 B1 | 5/2001 | Wycech |
| 6,244,601 B1 | 6/2001 | Buchholz et al. |
| 6,247,287 B1 | 6/2001 | Takabatake |
| 6,253,524 B1 | 7/2001 | Hopton et al. |
| 6,254,488 B1 | 7/2001 | Hill |
| 6,263,635 B1 * | 7/2001 | Czaplicki ................... 52/731.6 |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz |
| 6,303,672 B1 | 10/2001 | Papalos et al. |
| 6,305,136 B1 * | 10/2001 | Hopton et al. ............. 52/309.7 |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,348,513 B1 | 2/2002 | Hilborn et al. |
| 6,368,438 B1 | 4/2002 | Chang et al. |
| 6,372,334 B1 | 4/2002 | Wycech |
| D457,120 S | 5/2002 | Broccardo et al. |

| | | | |
|---|---|---|---|
| 6,382,635 B1 | 5/2002 | Fitzgerald | |
| 6,383,610 B1 | 5/2002 | Barz et al. | |
| 6,389,775 B1 | 5/2002 | Steiner et al. | |
| 6,406,078 B1 | 6/2002 | Wycech | |
| 6,413,611 B1 | 7/2002 | Roberts et al. | |
| 6,435,602 B1 | 8/2002 | Sukegawa et al. | |
| 2001/0020794 A1 | 9/2001 | Ishikawa | |
| 2001/0042353 A1 | 11/2001 | Honda et al. | |
| 2002/0033618 A1 | 3/2002 | Kwon | |
| 2002/0053179 A1 | 5/2002 | Wycech | |
| 2002/0054988 A1 | 5/2002 | Wycech | |
| 2002/0074827 A1 | 6/2002 | Fitzgerald et al. | |

FOREIGN PATENT DOCUMENTS

| | | |
|---|---|---|
| EP | 0 775 721 A1 | 5/1997 |
| EP | 0 891 918 A1 | 1/1999 |
| EP | 1 084 816 A2 | 3/2001 |
| EP | 1 122 156 A2 | 8/2001 |
| EP | 0 893 332 B1 | 3/2002 |
| FR | 2 749 263 | 12/1997 |
| GB | 2 156 412 A | 10/1985 |
| JP | 10 53156 | 2/1998 |
| JP | 02001191949 A | 7/2001 |
| WO | WO 87/01978 | 4/1987 |
| WO | WO 98/36944 | 8/1998 |
| WO | WO 99/28575 | 6/1999 |
| WO | WO 99/48746 | 9/1999 |
| WO | WO 00/03894 | 1/2000 |
| WO | WO 00/37302 | 6/2000 |
| WO | WO 00/55444 | 9/2000 |
| WO | WO 01/54936 | 8/2001 |
| WO | Wo 01/56845 | 8/2001 |
| WO | WO 01/71225 | 9/2001 |
| WO | WO 01/83206 | 11/2001 |

OTHER PUBLICATIONS

Copending Application Serial No. 09/939;152 filed Aug. 24, 2001.
Copending Application Serial No. 09/939,245 filed Aug. 24, 2001.
Copending Application Serial No. 09/982,681 filed Oct. 18, 2001.
Copending Application Serial No. 60/296,312 filed Jun. 6, 2001.
Copending Application Serial No. 60/317,009 filed Sep. 4, 2001.
Copending Application Serial No. 09/974,017 filed Oct. 10, 2001.
International Search Report dated Feb. 20, 2002.
Written Opinion dated Apr. 4, 2002.
International Preliminary Examination Report dated Jun. 24, 2002.

* cited by examiner

STRUCTURALLY ENHANCED ATTACHMENT OF A REINFORCING MEMBER

FIELD OF THE INVENTION

The present invention relates generally to improved methods and systems for structurally enhancing attachments and reinforcing members used in the manufacture of automotive vehicles. More particularly, the invention relates to an extrusion reinforcement system integrated along with an automotive reinforcement surface or substrate, such as a rocker reinforcement, wherein an expandable material is placed along stand-offs or bolt attachments securing the extrusion to the desired substrate. Upon activation of the expandable material, the material expands and forms a structural bond between the reinforcement substrate and the extrusion resulting in the improvement of structurally integrity of the extrusion application area and the reduction of labor demand and manufacturing processes required to secure the extrusion in place.

BACKGROUND OF THE INVENTION

Traditional automotive manufacturing operations often rely on the use of high-strength extrusions for placement in certain areas of the vehicle to improve structural stiffness and rigidity of the chosen area or application of the vehicle. Generally speaking, these prior art techniques employ the use of an extrusion consisting of one or more closed sections which are either bolted or welded to a vehicle mating panel or substrate, such as a rocker reinforcement, and are further characterized by having stand-offs as part of the extrusion which allow the extrusion to maintain a desired torque when bolted or welded to the panel or substrate. Typically, this step or process involves the use of purely localized bolt attachments at certain points throughout the extrusion which may result in non-uniform reinforcement. This process also requires the vehicle manufacturer to allocate tooling, floor space, and added labor in the manufacturing facility to either weld or both the extrusion to the desired automotive application.

While these prior art devices perform well and are advantageous in many circumstances, they often require a large capital and labor investment to integrate the bolted or welded extrusion into the chosen manufacturing facility, utilize a large amount of floor space and maintenance resources at the vehicle assembly plant, and require an additional manufacturing process and labor demand. In turn, the manufacturer is required to devote both financial and technical resources to develop tooling for the bolted or welded extrusion and is required to test the structure to determine if the localized bolt attachments or welds are optimally placed for structural reinforcement, which adds potential cost and delay, particularly if changes to the vehicle structure are implemented during the design stages.

Accordingly, there is need for a simple low cost system that provides an integrated extrusion having an expandable or structurally reinforcing material placed along the extrusion which expands and fills to form a structural bond between the extrusion and the automotive substrate, and which can be employed across a wide range of different sizes or shapes of extrusions.

SUMMARY OF THE INVENTION

The present invention is directed to a structural reinforcement system which can be integrated with an aluminum extrusion, and particularly one for automotive vehicle space frame structures, such as (without limitation) rocker reinforcements, vehicle door beam assemblies, vehicle roof and pillar assemblies. The system generally employs extrusion techniques in the form of a mini-applicator technology for facilitating the application of an expandable and structurally reinforcing material onto the extrusion through an extrude-in-place process. It is contemplated that the material disclosed in the present invention functions as an anti-vibration dampener and structural reinforcement when expanded and bonded from the surface of the extrusion to the chosen automotive substrate, such as a rocker reinforcement, when the rocker reinforcement (now attached to the vehicle in the assembly operation), is processed through e-coat and paint cycles in a vehicle assembly plant. In one embodiment, the material is heat expandable and at least partially fills the gap which may exist between the extrusion and rocker by cross-linking and structurally adhering the extrusion and the rocker reinforcement during the painting operation thereby reducing noise and vibration characteristics of the vehicle as well as structurally reinforcing the vehicle and the rocker reinforcement. In another embodiment, the material is a melt-flow material, and upon the application of heat will spread over the surface of the extrusion thereby providing a uniform flow and reinforcement along any seam, gap, or cavity that may exist between a traditional extrusion bolted or welded on the rocker reinforcement.

In a particular preferred embodiment, the expandable material or medium comprises at least one strip applied along the surface of an aluminum extrusion between the extrusion stand-offs and any bolt attachment means in a solid (though pliable) form in accordance with the teachings of commonly owned U.S. Pat. No. 5,358,397 ("Apparatus For Extruding Flowable Materials"), hereby expressly incorporated by reference. The expandable material or medium is at least partially coated with an active polymer having structural reinforcement characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like). The strip of material then expands from the surface of the extrusion and bonds to the rocker reinforcement of the vehicle when exposed to the e-coat process as well as other paint operation cycles encountered in a final vehicle assembly facility.

In a particular non-limiting embodiment, a plurality of strips comprised of the expandable material or medium are transformed from a solid or dry chemical state to a visco-elastic stage through the use of a mini-applicator which processes the strips at a temperature sufficient to transform the strips into a visco-elastic material capable of flowing onto the external surface of an aluminum extrusion in a desired consistency, thickness, and pattern.

The heat application and other shear functions from the mini-applicator allows the material to flow in a uniform shape and manner as it is placed onto an external surface of the extrusion where it bonds. Once applied to the external service of the extrusion by the mini-applicator and no longer exposed to the heat source emanating from the mini-applicator, the material returns to it solid or dry chemical state and thereby remains in place along the extrusion. The extrusion is then mounted within a rocker assembly or other automotive application by the vehicle manufacture in accordance with manufacturing techniques that are well known in the art. As the rocker assembly is prepared for final assembly of the vehicle, it is processed through e-coat and other heat-inducing paint operations which result in expansion and bonding of the material from the extrusion to an outer surface portion of the rocker assembly where it cures and remains in place. It is contemplated that the material expands from the external surface of the extrusion and cross-links to the rocker substrates in structural adherence serving to reduce the noise and vibration emanating from the rocker assembly and, more particularly, providing structural reinforcement to the rocker assembly. Although the preferred embodiment discloses the material essentially chemically cross-linking and structurally adhering from the external surface of the extrusion into contact with the rocker assembly in the configuration of a strip placed along the surface of the extrusion, it will be appreciated that various patterns and applications of the material along the extrusion would allow the material to expand and chemically cross-link with either or both of the extrusion and the rocker assembly as well as any other substrate that may be utilized or encountered in an automotive structural reinforcement application or other application which would facilitate either passenger of cargo access to a vehicle.

In one embodiment the expandable material or medium is placed onto the exterior surface of an aluminum extrusion in a continuous or non-continuous manner adjacent to one or more gaps or walls defining a cavity between the extrusion and an automotive rocker assembly. The expandable material or medium is activated to accomplish transformation (e.g., expansion or flow) of the active polymer or polymer within the gap after the extrusion is mounted onto the vehicle and the vehicle is exposed to heat as it is processed through the e-coat and paint operation cycles of a final automotive assembly plant, which is well known in the art. The resulting structure includes a wall or expansive extrusion that is coated over at least a portion of its surface with the expandable material acting to reduce vibration during transport and provide structural reinforcement, stiffness, and rigidity to the rocker assembly. It will be appreciated that a preferred expandable material would consist of a material comprising a number of chemical formulations including, but not limited to, metal (such as steel, aluminum, etc.), rubber (such as a butyl or isobutylene polymer, copolymer, or similar elastomer having good dampening and reinforcement characteristics), and plastic polymer chemistry (ideally material that would remain rigid at temperatures generally encountered by an automotive body skin during operation of the vehicle, for example −40° C. to 190° C.

DESCRIPTION OF THE DRAWINGS

The features and inventive aspects of the present invention will become more apparent upon reading the following detailed description, claims, and drawings, of which the following is a brief description:

DESCRIPTION OF PREFERRED EMBODIMENT

Figure 1:
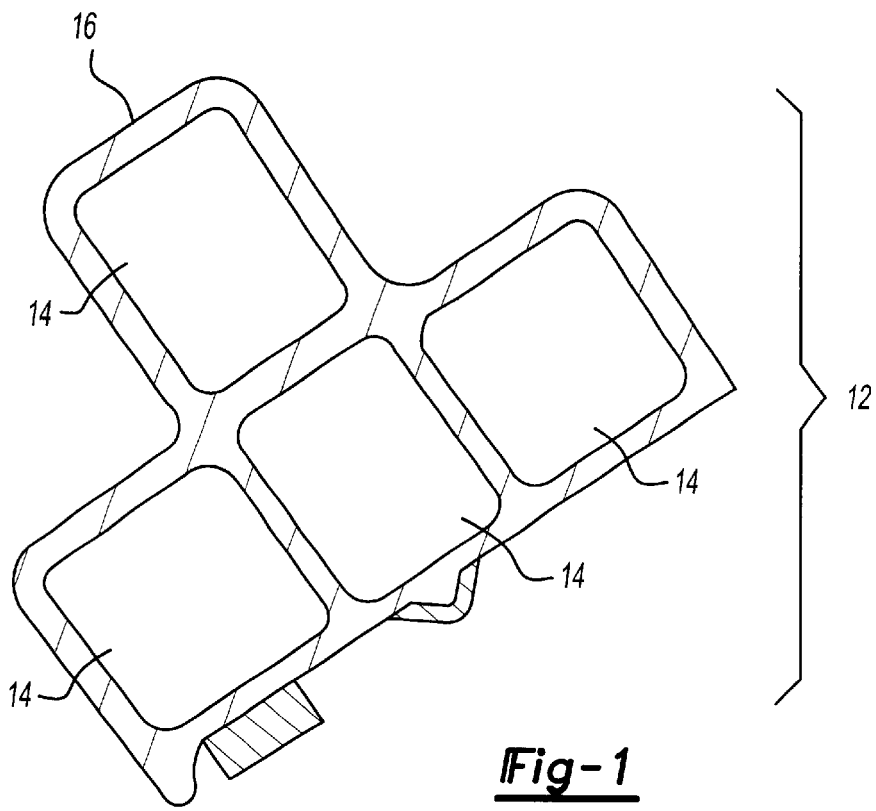
FIG. 1 is a cutaway plan view of an extrusion adapted for placement within an automotive rocker assembly in accordance with the present invention prior to activation of the material.

FIG. 1 illustrates an example of a structurally enhanced attachment for reinforcing an extrusion showing portions of an extrusion attachment suitable for attachment to an automotive rocker structure. As will be appreciated, it is common for such structures to include a plurality of hollow-portioned panel members that are joined and shaped to define the rocker assembly, within which there are cavities. One such structure, for purposes of illustration (without limitation) is a rocker assembly. As will be recognized, associated with the rocker assembly may also be other automotive frame applications, door beam assemblies, cargo doors, hatchbacks, sliding doors, easy access third doors, door handles, locks, window assemblies or other vehicle doors and door components, sub-frame construction, or the like. Other vehicle body members for example (plastics, composites, metals (e.g., steel, aluminum, magnesium based, or the like) are also contemplated as being treated in accordance with the present invention.

Figure 2:
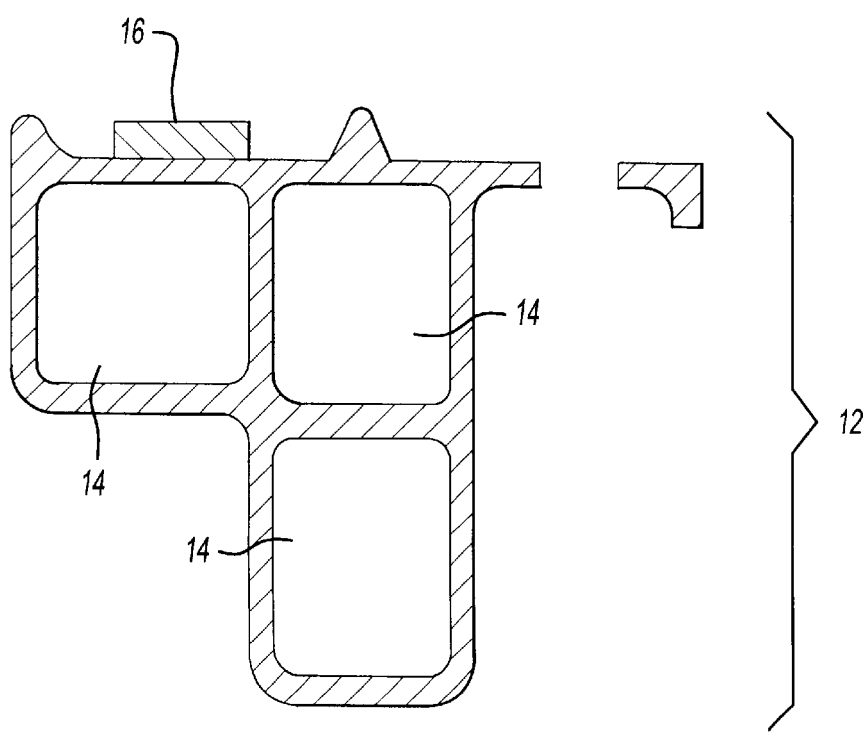
FIG. 2 is a partially exploded cutaway plan view of an extrusion adapted for placement within an automotive vehicle in accordance with the present invention.

It is contemplated that a variety of rocker applications may be treated in accordance with the present invention. For example, a portion of the rocker structure found within an automotive application may comprise plurality of rocker panels which bridges the structure at a first end and a second end, the rocker or other structure defining the rocker assembly compartment. As illustrated in the cutaway views of FIGS. 1 and 2, the extrusion 12 generally consists of one or more closed sections 14, which are traditionally bolted to a panel, such as the rocker reinforcement. In practice, this may consist of an aluminum extrusion having a plurality of stand-offs that can maintain a desired torque when bolted along and onto the rocker reinforcement and which assists in the reinforcement of the structure 10 with any suitable cross sectional configuration or reinforcements. The rocker itself might be hollow and further reinforced, using technology such as that disclosed in U.S. Pat. Nos. 4,922,596, 4,978,562, 5,124,186, and 5,884,960 and commonly owned, co-pending U.S. application Ser. Nos. 09/502,686 filed Feb. 11, 2000 and 09/524,961 filed Mar. 14, 2000, all of which are expressly incorporated by reference.

Structural reinforcement of the structure and the rocker reinforcement is accomplished according to the present invention by an extrusion-in-place or mini-extrusion application of an appropriate pattern of an expandable material 16 of the type discussed herein along the outer surface of the aluminum extrusion, and more preferably by applying the material over at least a portion of the extrusion in the form of a strip or in accordance with the extrusion techniques, apparatus, and methods set forth in commonly assigned U.S. Pat. No. 5,358,397, incorporated by reference. It will also be appreciated that the material may comprise pellets or beads extruded along the aluminum in a variety of continuous and non-continuous patterns. In this regard, it is contemplated that technology disclosed in co-pending U.S. application Ser. No. 09/631,211 for a Sound Absorption System For Automotive Vehicles, incorporated by reference, may be employed in the present invention. The expandable material preferably is fixedly secured to at least one portion of the extrusion by one of its own external surfaces. Accordingly, it is preferred that the expandable material is a polymeric foam that includes a bonding component, which maintains it in place on the external surface of the extrusion, and thereafter, upon heat activation maintains its adhesion to the extrusion but expands to form a foam within the hollow cavity between the extrusion and the rocker reinforcement. Thus, preferably the expandable material is a heat-activated material having an adhesive component.

Though other heat-activated materials are possible, a preferred heat activated material is an expandable or flowable polymeric formulation, and preferably one that is activate to foam, flow or otherwise change states when exposed to the heating operation of a typical automotive assembly painting operation. A particularly preferred material is an active polymer formulated in strip form and other olefinic polymer-based acoustic foams, and more particularly an ethylene based polymer. For example, without limitation, in one embodiment, the polymeric foam is based on ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L Products, inc. of Romeo, Mich., under the designations as L-2105, L-2100, L-7005 or L-2018, L-7101, L-7102, L-2411, L-2412, L-4141, etc. and may comprise either open or closed cell polymeric base material.

A number of other suitable materials are known in the art and may also be used for structural reinforcement. One such foam preferably includes a polymeric base material, such as an ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally activated material, the structural reinforcement foam is usually initially processed as a flowable thermoplastic material before curing. It will cross-link and structurally adhere upon curing, which makes the material resistant of further flow or change of final shape.

One advantage of the expandable material is that the preferred materials can be processed in several ways, thereby affording substantial design and production flexibility. For instance, without limitation, the preferred materials can be processed by extrusion techniques discussed herein, injection molding, compression molding, or with a mini-applicator discussed herein. This enables the formation and creation of structural reinforcement shaping not necessarily limited to strips along the aluminum extrusion that exceed the capability and maintenance/cleanliness issues of most prior art materials, which comprise bolt or weld applications. In one preferred embodiment, the material or strip or even a plurality of strips (in its uncured state) is generally dry or relatively free of tack to the touch. In another embodiment, the material is applied to the rocker assembly through a robotic extrusion process, which serves to minimize the maintenance of wet or tacky mediums and further functions to reduce labor demand on the vehicle manufacturer.

In a particular non-limiting embodiment, the material is applied to the aluminum extrusion through the use of a mini-applicator which applies heat and shear to the material in accordance with the teachings of commonly-owned U.S. Pat. No. 5,358,397 ("Apparatus For Extruding Flowable Materials"), which, in turn, transforms the material from a solid or dry chemical state to a visco-elastic state inside the mini-applicator for application of the material to the desired surface in a desired pattern or consistency, in this embodiment an external surface of an aluminum extrusion for use in automotive vehicles.

It is contemplated that the mini-applicator prepares the material into a visco-elastic state which can easily and uniformly be applied to an exterior surface of the aluminum extrusion in a relatively clean manner where it hardens and bonds. It will be appreciated that the material can be applied to the aluminum extrusion in a uniform shape, thickness, or consistency (i.e. not limited to a strip), which could comprise a continuous flow, a non-continuous flow, a pattern application, and even a ribbed design depending upon the particular application and sizing found between the extrusion and the related rocker assembly. Once the mini-applicator applies the material to the aluminum extrusion in the desired shape and pattern, the material cools at the ambient temperature found in the manufacturing facility which allows the material to return substantially to its original solid or dry chemical state thereby bonding and adhering the material to the external surface of the extrusion. The extrusion can then be mounted onto the rocker assembly prior to assembly of the vehicle by the vehicle manufacturer. The rocker assembly and vehicle is then prepared for application of the e-coat process as well as other paint operation cycles commonly found in an automotive manufacturing facility. These e-coat and paint operating cycles generally involve exposure to heat through cure ovens which activate the material and allows it to expand, thereby chemically cross-linking and structurally adhering the material on the external surface of the extrusion to the rocker assembly thereby providing a walled or expansive structure which provides structural reinforcement and further serves to reduce vibration and noise during transport of the vehicle.

While the preferred materials for fabricating the expandable material have been disclosed, the material can be formed of other materials (e.g., foams regarded in the art as structural foams) provided that the material selected is heat-activated or otherwise activated by an ambient condition (e.g. moisture, pressure, time or the like) and cures in a predictable and reliable manner under appropriate conditions for the selected application. One such material is the polymeric based resin disclosed in commonly owned, co-pending U.S. patent application Ser. No. 09/268,810 (filed Mar. 8 1999), the teachings of which are incorporated herein by reference.

Some other possible materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In this regard, in applications where a heat activated, thermally expanding material is employed as the structural reinforcement material, a consideration involved with the selection and formulation of the material is the temperature at which a material reaction or expansion, and possibly curing, will take place. For instance, in most applications, it is undesirable for the material to be reactive at room temperature or otherwise at the ambient temperature in a production line environment since, in one embodiment, the material is placed along the aluminum extrusion and then shipped to the vehicle manufacturer as an integrated product. More typically, the material becomes reactive at higher processing temperatures, such as those encountered in an automobile assembly plant, when the material is processed along with the vehicle components at elevated temperatures or at higher applied energy levels, e.g., during E-coat preparation steps and other paint cycles. While temperatures encountered in an automobile e-coat operation may be in the range of about 145° C. to about 210° C. (about 300° F. to 400° F.), primer, filler and paint shop applications are commonly about 93.33° C. (about 200° F.) or higher. The material is thus operative throughout these ranges. If needed, blowing agent activators can be incorporated into the composition to cause expansion at different temperatures outside the above ranges.

Generally, suitable structural reinforcement materials have a range of expansion ranging from approximately 0 to over 1000 percent. The level of expansion of the vibration reduction material 16 may be increased to as high as 1500 percent or more. The material may be expandable to a degree (or otherwise situated on a surface) so that individual nodes remain separated from one another upon expansion, or they may contact one another (either leaving interstitial spaces or not).

In another embodiment, the material is provided in an encapsulated or partially encapsulated form, which may comprise a pellet or bead, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

Moreover, the expandable material may include a melt-flowable material such as that disclosed in U.S. Pat. No. 6,030,701 (expressly incorporated by reference).

Referring again to FIG. 2, there is shown one example of an application of the material along an extrusion in a strip form prior to heat activation or foaming wherein the material is continuously extruded. The skilled artisan will appreciate that this strip pattern is but one of many patterns that may be employed. It is contemplated that the material, after expansion, may contain a plurality of nodes which are generally disposed in a random pattern and are generally suitable for structural reinforcement as well as the absorption of vibrations and other sound frequencies emanating from the rocker assembly or otherwise generated by the vehicle or its components including road induced noise and absorb the same. In one preferred embodiment, such patterns and the selection of the material is made for achieving generally miniaturized chamber areas, where it is believed that vibrational energy can be dissipated through the expandable material.

In addition, as discussed previously, preformed patterns may also be employed such as those made by extruding a sheet (having a flat or contoured surface) and then die cutting it according to a predetermined configuration in accordance with the rocker assembly, and applying it thereto.

The skilled artisan will appreciate that the use of the structural reinforcement system disclosed herein is not intended as being limited only to illustrate rocker assembly locations. They can be used in any location within an automotive vehicle that utilizes a mounted aluminum extrusion. For instance, other reinforced locations are also possible including, but not limited to, sliding side doors, hatchbacks, rear cargo doors, gates, and crew/club cab designs and the like. Still further, the extrusion adapted for stiffening the structure to be reinforced could comprise a stamped and formed cold-rolled steel, a stamped and formed high strength low alloy steel, a roll formed cold rolled steel, or a roll formed high strength low alloy steel.

Moreover, the skilled artisan will appreciate that the present structural reinforcement system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A system for the structural reinforcement of an automotive rocker assembly, comprising:
   (a) an extrusion placed within a cavity of an automotive vehicle rocker structure and attached via bolt attachments to the automotive vehicle rocker structure, wherein;
      i) the extrusion includes a substantially continuous outer peripheral surface generally surrounding a plurality of closed sections;
      ii) the outer peripheral surface defines a first stand-off and a second stand-off means for assisting in maintaining torque of the bolt attachments, wherein the first and the second stand-off are protrusions which are part of the extrusion that extend away from the extrusion and contact the rocker structure thereby forming a cavity between the first stand-off and the second stand-off;
   (b) a heat-activated expandable material for structural reinforcement located on at least a portion of the outer peripheral surface of the extrusion and within the cavity between the first stand-off and the second stand-off wherein the heat-activated expandable material located within the cavity is a strip of heat-activated expandable material;
   wherein the heat-activated expandable material, in conjunction with the bolt attachments, distributes forces applied to the rocker structure to the extrusion, and wherein the heat-activated expandable material expands locally within the cavity between the first stand-off and the second stand-off and between the bolt attachments upon activation by heat to form a structural bond between the automotive vehicle rocker structure and the extrusion thereby improving the structural integrity of at least a portion of the rocker structure to which the extrusion has been applied.

2. The system as in claim 1 wherein the first stand-off and second stand-off assist the extrusion in maintaining torque when the extrusion is attached to the automotive vehicle rocker structure.

3. The system as in claim 1 wherein the expandable material is in contact substantially only with the extrusion prior to expansion of the expandable material.

4. The system as in claim 1 wherein the extrusion is comprised of aluminum.

5. The system as in claim 1, wherein the extrusion is comprised of a stamped and formed cold rolled steel.

6. The system as in claim 1, wherein the extrusion is comprised of a stamped and formed high strength low alloy steel.

7. The system as in claim 1, wherein the extrusion is comprised of a roll formed cold rolled steel.

8. The system as in claim 1, wherein the extrusion is comprised of a roll formed high strength low alloy steel.

9. The system as in claim 1, wherein the expandable material is a heat activated thermoplastic foamable material.

10. The system as in claim 1, wherein the expandable material comprises an extruded strip.

11. The system as in claim 1 wherein the rocker structure is an automotive rocker reinforcement panel.

12. The system as in claim 1 wherein the expandable material is a heat activated expandable polymer foam.

13. The system as in claim 1 wherein the expandable material is an expandable ethylene based foam that is substantially free of tack to the touch.

14. The system as in claim 1 wherein the expandable of material is an expandable ethylene based foam that is activated at a temperature encountered in an automotive vehicle paint operation.

15. A system for the structural reinforcement of an automotive rocker assembly, comprising:
   (a) an aluminum extrusion placed within a cavity of an automotive vehicle rocker structure and attached to the rocker structure via weld or bolt attachments wherein;
     i) the extrusion includes a substantially continuous outer peripheral surface generally surrounding at least three closed sections, wherein the at least three closed sections are generally rectangular in cross-section;
     ii) the outer peripheral surface defines a first stand-off and a second stand-off means for assisting in attaching the extrusion to the rocker structure, wherein the first and the second stand-off are protrusions which are part of the extrusion that extend away from the extrusion and contact the rocker structure thereby forming a cavity between the first stand-off and the second stand-off,
   (b) a heat-activated expandable material for structural reinforcement located on at least a portion of the outer peripheral surface of the extrusion and within the cavity between the first stand-off and the second stand-off, wherein the heat-activated expandable material located within the cavity is a strip of heat-activated expandable material and the heat-activated expandable material on the outer peripheral surface is an extruded heat-activated expandable material;
   wherein the heat-activated expandable material, in conjunction with the weld or bolt attachments, distributes forces applied to the rocker structure to the extrusion, and wherein the heat-activated expandable material expands locally within the cavity between the first stand-off and the second stand-off and between the bolt attachments upon activation by heat to form a structural bond between the automotive vehicle rocker structure and the extrusion thereby improving the structural integrity of at least a portion of the rocker structure to which the extrusion has been applied, wherein the expandable material is in contact substantially only with the extrusion prior to its expansion.

16. The system as in claim 15 wherein the first stand-off and second stand-off assist the extrusion in maintaining torque when the extrusion is attached to the automotive vehicle rocker structure.

17. The system as in claim 15 wherein the expandable material is a heat activated thermoplastic foamable material.

18. The system as in claim 15 wherein the expandable material comprises an extruded strip.

19. The system as in claim 15 wherein the rocker structure is an automotive rocker reinforcement panel.

20. The system as in claim 15 wherein the expandable material is a heat activated expandable polymer foam.

21. The system as in claim 15 wherein the expandable material is an expandable ethylene based foam that is substantially free of tack to the touch.

22. The system as in claim 15 wherein the expandable material is an expandable ethylene based foam that is activated at a temperature encountered in an automotive vehicle paint operation.

* * * * *